H. G. VOIGHT.
TIRE LOCK.
APPLICATION FILED SEPT. 3, 1919.
1,358,184.
Patented Nov. 9, 1920.
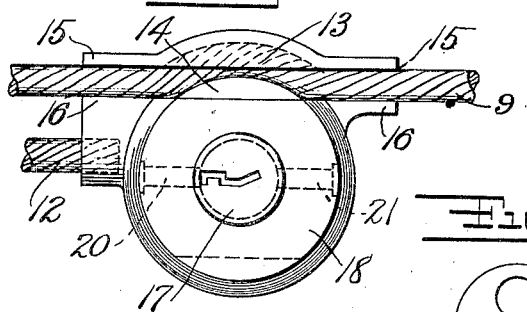
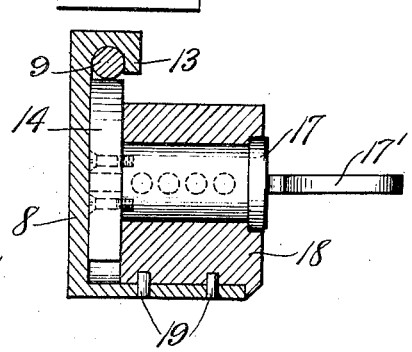
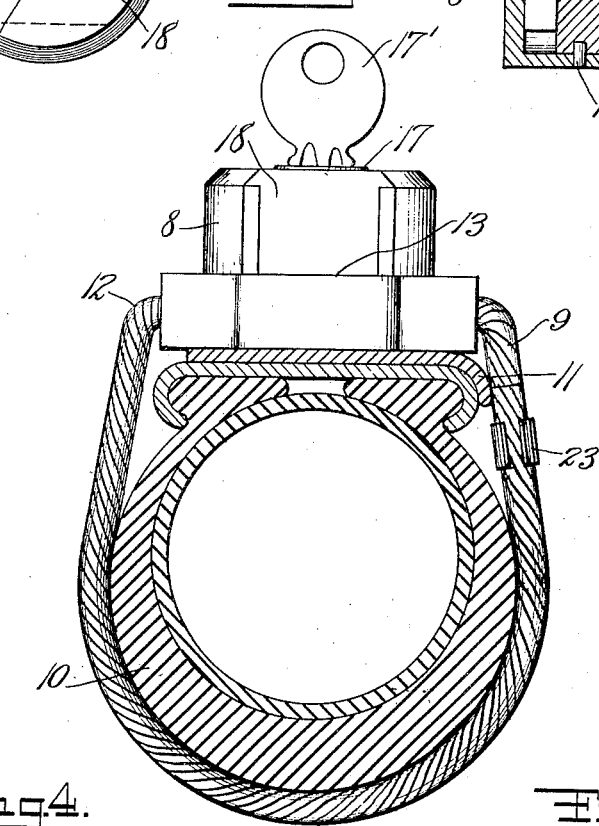
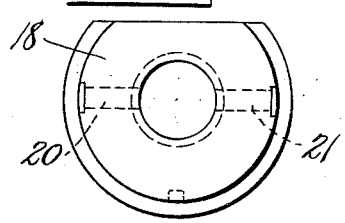
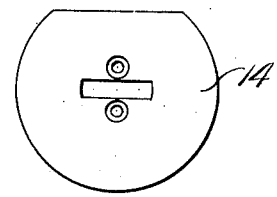
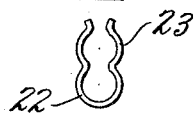
Inventor
H. G. VOIGHT
By Attorney

UNITED STATES PATENT OFFICE.

HENRY G. VOIGHT, OF NEW HAVEN, CONNECTICUT.

TIRE-LOCK.

1,358,184.  Specification of Letters Patent.  Patented Nov. 9, 1920.

Application filed September 3, 1919. Serial No. 321,316.

*To all whom it may concern:*

Be it known that I, HENRY G. VOIGHT, a citizen of the United States of America, residing at New Haven, Connecticut, have invented a new and useful Tire-Lock, of which the following is a specification.

My invention relates particularly to means for securing one or more tires or rims to an automobile but it will be obvious that it may be used for other purposes.

The main object is to provide a simple and inexpensive construction for preventing tires and rims from being stolen or removed by unauthorized persons.

In its preferred form the invention contemplates the use of a flexible cable adapted to be wound around one or more tires or rims with locking operated means for clamping the cable and thus holding the tires or rims together and to the car or other support.

Figure 1, shows the invention applied to a tire and its support.

Fig. 2, is a front view of the principal parts of the mechanism showing the cable locked.

Fig. 3 is a longitudinal sectional view of the same.

Fig. 4 is a rear view of the housing for the key plug.

Fig 5 is a rear view of the locking cam.

Fig. 6, is a detail view of a clip for securing the free end of the cable to prevent it from flapping.

The main body or housing 8 of the device, may be secured to a support in any suitable manner or the cable 9 may itself be passed around the tire 10 and some fixed support such as 11. The end 12 of the cable is fixed to the housing 8 and the other end is adapted to be clamped or gripped in a jaw 13 of the housing by means of a rotatable cam 14 which is capable of directly engaging said cable so as to bend the same into the curve of the jaw. The housing is preferably provided with shoulders such as 15, 15 and 16, 16 which co-act with the cable to more securely hold it in place when the cam is in the position shown in Fig. 2.

The cam 14 may be operated in different ways. For instance, by a combination lock or by a key operated lock. In the form herein shown the plug 17 of the cylinder lock is mounted to rotate in the barrel 18 which is secured to the housing 8 in any suitable manner, such as by pins 19. The cam 14 is secured to the rear end of the plug 17 so as to rotate therewith. The barrel 18 is provided with two chambered portions 20 and 21 for the springs and outer ends of the pin tumblers (not shown). The tumblers and key 17' are so constructed that the key may be withdrawn when the key slot faces either set of tumblers. It is therefore possible to turn the plug 17 and the cam 14 through 180° in either direction so as to hold the cam in the locked or the unlocked positions as desired. When the cam is turned into the locked position, the outer curved surface bends the cable so as to form a bight which is forced into the recess in the jaw 13 so to hold the cable securely against slipping.

A clamp may be provided with a seat 22 for the relatively stationary part of the cable and having spring jaws 23 to receive the free end of the cable and hold it in position so that it will not flap.

Such a cable and lock afford a quick and effective means of securing a tire against loss.

I claim:

1. In a tire lock, a housing having an undercut gripping jaw, a cable, a rotatable cam for engaging and bending the cable into engagement with said jaw, means for operating said cam, and means independent of the cam for causing the latter to be locked in one position.

2. In a tire lock, a housing having an undercut gripping jaw, a cable, a rotatable cam for engaging and bending the cable into engagement with said jaw, key controlled means for operating said cam, and means coacting with said key-controlled means for locking the cam in one position.

3. In a device of the character described, a housing having a cable gripping jaw open upon one side to permit a cable to be inserted transversely therein without substantial bending of the cable, a cam movable in the housing and adapted to force a cable into said jaw, and means for moving said cam.

4. In a device of the character described, a housing member having a curved cable gripping jaw and shoulders adjacent said jaw, a cam movable in said housing and adapted to force a cable into said jaw, said housing member and cam being so formed as to permit a cable to be inserted between the jaw and cam without substantial bending of the cable when the cam is in one position.

5. In a construction such as claimed in claim 4 and means for locking said cam in one position.

6. In a device of the character described, a housing having a cable gripping jaw open upon one side to permit a cable to be inserted transversely of its length without substantial bending of the cable, a member carried by said housing and spaced from one end thereof, a cam rotatable in the space between the housing and member and adapted to force a cable into said jaw, means carried by said member for rotating said cam and means for causing said last mentioned means to be locked in one position.

HENRY G. VOIGHT.